United States Patent
Mizushita et al.

(10) Patent No.: US 12,081,001 B2
(45) Date of Patent: Sep. 3, 2024

(54) WIRING MEMBER HAVING A BUFFER MEMBER

(71) Applicant: Sumitomo Wiring Systems, Ltd., Mie (JP)

(72) Inventors: Masaki Mizushita, Mie (JP); Ryusuke Kudo, Mie (JP); Tetsuya Nishimura, Mie (JP); Haruka Nakano, Mie (JP); Kenta Arai, Mie (JP)

(73) Assignee: SUMITOMO WIRING SYSTEMS, LTD., Mie (JP)

(*) Notice: Subject to any disclaimer, the term of this patent is extended or adjusted under 35 U.S.C. 154(b) by 219 days.

(21) Appl. No.: 17/777,208

(22) PCT Filed: Nov. 6, 2020

(86) PCT No.: PCT/JP2020/041545
§ 371 (c)(1),
(2) Date: May 16, 2022

(87) PCT Pub. No.: WO2021/100498
PCT Pub. Date: May 27, 2021

(65) Prior Publication Data
US 2022/0407296 A1    Dec. 22, 2022

(30) Foreign Application Priority Data
Nov. 22, 2019 (JP) .................... 2019-211050

(51) Int. Cl.
*H01B 7/04* (2006.01)
*B60R 16/02* (2006.01)
(Continued)

(52) U.S. Cl.
CPC ....... *H02G 3/0406* (2013.01); *B60R 16/0215* (2013.01); *H01B 7/04* (2013.01); *H01B 7/08* (2013.01)

(58) Field of Classification Search
CPC .... H02G 3/0406; B60R 16/0215; H01B 7/04; H01B 7/08
(Continued)

(56) References Cited

U.S. PATENT DOCUMENTS

| 2013/0020125 A1 | 1/2013 | Murata et al. |
| 2014/0272218 A1 | 9/2014 | Thomas et al. |

(Continued)

FOREIGN PATENT DOCUMENTS

| CN | 208508415 | 2/2019 |
| CN | 209150650 | 7/2019 |

(Continued)

OTHER PUBLICATIONS

Office Action, Japan Patent Office, in counterpart Japanese Patent Application No. 2019-211050, issued on Oct. 25, 2022, with English translation.

(Continued)

*Primary Examiner* — Timothy J Thompson
*Assistant Examiner* — Michael F McAllister
(74) *Attorney, Agent, or Firm* — GREENBLUM & BERNSTEIN, P.L.C.

(57) ABSTRACT

A wiring member includes: a wiring body including a wire-like transmission member and a sheet to which the wire-like transmission member is fixed; a cover that covers the wiring body; and a buffer member, in which the wire-like transmission member includes a transmission wire body and a coating layer that covers the transmission wire body, the cover is a member harder than the coating layer, and the buffer member is provided at at least one end of the cover, and is disposed between the wire-like transmission member and the cover.

14 Claims, 6 Drawing Sheets

(51) Int. Cl.
*H01B 7/08* (2006.01)
*H02G 3/04* (2006.01)

(58) Field of Classification Search
USPC ....................................................... 174/72 A
See application file for complete search history.

(56) References Cited

U.S. PATENT DOCUMENTS

| | | | |
|---|---|---|---|
| 2015/0014052 A1* | 1/2015 | Matsuda | H01B 7/0045 |
| | | | 174/72 A |
| 2016/0156165 A1* | 6/2016 | Katou | B60R 16/0215 |
| | | | 174/99 R |
| 2018/0182509 A1 | 6/2018 | Sugino | |
| 2019/0392963 A1 | 12/2019 | Ishida et al. | |

FOREIGN PATENT DOCUMENTS

| | | |
|---|---|---|
| EP | 1 355 396 | 10/2003 |
| GB | 2152768 | 8/1985 |
| JP | 61-147718 | 7/1986 |
| JP | 5-159632 | 6/1993 |
| JP | 2014-193058 | 10/2014 |
| JP | 2016-5293 | 1/2016 |
| JP | 2018-107918 | 7/2018 |
| JP | 2018-137208 | 8/2018 |
| WO | 2011/136202 | 11/2011 |
| WO | 2017/208893 | 12/2017 |

OTHER PUBLICATIONS

International Search Report, International Patent Application No. PCT/JP2020/041545, issued Jan. 12, 2021, with English translation.
International Preliminary Report on Patentability, International Patent Application No. PCT/JP2020/041545, issued May 17, 2022, with English translation.
China Office Action issued in CN Application No. 202080079845.8, dated Mar. 1, 2024.

* cited by examiner

WIRING MEMBER HAVING A BUFFER MEMBER

TECHNICAL FIELD

The present disclosure relates to a wiring member.

BACKGROUND ART

Patent Document 1 discloses a wire harness in which an electric wire is welded to a functional exterior member formed in a sheet shape.

PRIOR ART DOCUMENT

Patent Document

Patent Document 1: Japanese Patent Application Laid-Open No. 2018-137208

SUMMARY

Problem to be Solved by the Invention

In the wire harness as described in Patent Document 1, it is desired that the electric wire is protected from the cover while a hard cover is provided.

Therefore, an object is to provide a technique capable of protecting a wire-like transmission member from a cover.

Means to Solve the Problem

A wiring member of the present disclosure includes: a wiring body including a wire-like transmission member and a sheet to which the wire-like transmission member is fixed; a cover that covers the wiring body; and a buffer member. The wire-like transmission member includes a transmission wire body and a coating layer that covers the transmission wire body. The cover is a member harder than the coating layer. The buffer member is provided at at least one end of the cover, and is disposed between the wire-like transmission member and the cover.

Effects of the Invention

According to the present disclosure, the wire-like transmission member can be protected from the cover.

DESCRIPTION OF EMBODIMENTS

Description of Embodiments of Present Disclosure

First, embodiments of the present disclosure will be listed and described.

A wiring member of the present disclosure is as follows.

(1) A wiring member according to the present disclosure is a wiring member including: a wiring body including a wire-like transmission member and a sheet to which the wire-like transmission member is fixed, a cover that covers the wiring body; and a buffer member, in which the wire-like transmission member includes a transmission wire body and a coating layer covering the transmission wire body, the cover is a member harder than the coating layer, and the buffer member is provided at at least one end of the cover, and is disposed between the wire-like transmission member and the cover. By providing the buffer member between the cover and the wire-like transmission member, the wire-like transmission member comes into contact with the buffer member. As a result, the wire-like transmission member is prevented from coming into contact with the edge of the cover, and the edge of the cover is prevented from damaging the wire-like transmission member.

(2) The buffer member may be a member softer than the cover. As a result, a buffer member that is less likely to damage the wire-like transmission member than the cover is easily provided.

(3) The buffer member may be a member softer than the coating layer. This makes it more difficult for the buffer member to damage the wire-like transmission member.

(4) The buffer member may have a dimension capable of coming into contact with the plurality of wire-like transmission members along the width direction of the sheet. Thus, the plurality of wire-like transmission members can be easily covered.

(5) The buffer member may be provided by bending a part of the sheet. Accordingly, even when the buffer member is provided, an increase in the number of components can be suppressed.

(6) The buffer member may be provided separately from the sheet. This increases the degree of freedom in the properties and the like of the buffer member.

(7) The buffer member may be fixed to the wire-like transmission member. As a result, the buffer member is positioned on the wire-like transmission member.

(8) The buffer member may be fixed to the cover. As a result, the buffer member is positioned on the cover.

(9) The buffer member may be fixed to the sheet on a side of the wire-like transmission member. Accordingly, the buffer member is positioned on the sheet.

(10) The buffer member and a fixing partner may be fixed by adhesion or fusion. As a result, the buffer member and the fixing partner are easily fixed.

(11) The buffer member may include a portion overlapping an edge of the cover and a portion protruding from the edge of the cover. As a result, the edge of the cover is less likely to come into contact with the wire-like transmission member.

(12) The buffer member may be formed using a non-woven cloth as a material. This makes it more difficult for the buffer member to damage the wire-like transmission member.

(13) The cover may include a first cover that covers only a part of the sheet along the longitudinal direction, one end of the first cover may be located at an intermediate portion along the longitudinal direction of the sheet, and the buffer member may be provided at an edge of one end of the first cover. As a result, the wire-like transmission member is protected from the edge of the cover at the intermediate portion of the sheet.

(14) The cover may include a second cover provided at an interval from the first cover along the longitudinal direction of the sheet, and the buffer member may be provided over one end of the first cover and one end of the second cover. As a result, a portion of the wire-like transmission member located between the first cover and the second cover is protected by the buffer member.

DETAILS OF EMBODIMENTS OF PRESENT DISCLOSURE

Specific examples of the wiring member of the present disclosure will be described below with reference to the drawings. Note that the present disclosure is not limited to these examples, but is indicated by the claims, and is intended to include all modifications within the meaning and scope equivalent to the claims.

First Embodiment

Figure 1:
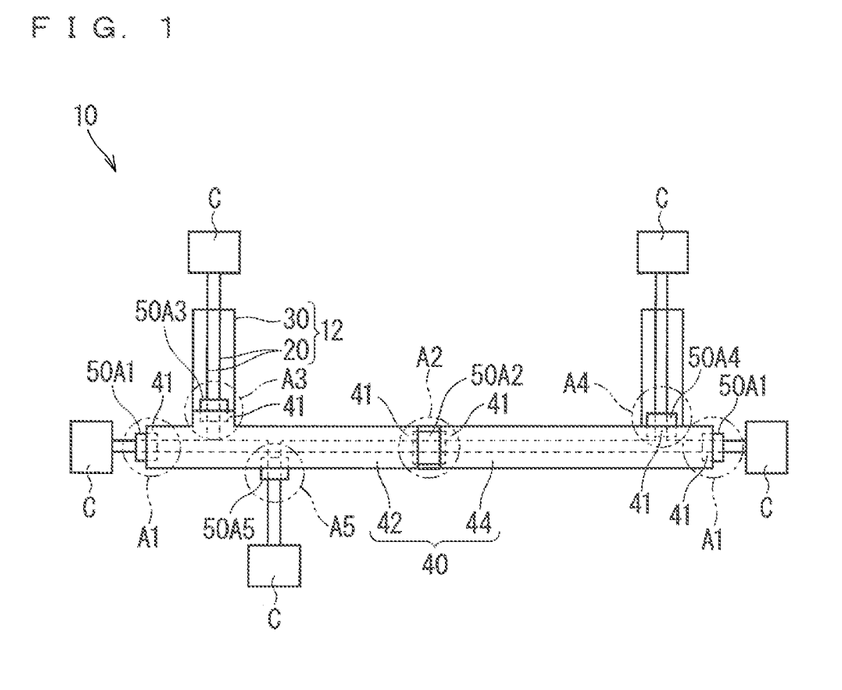
FIG. 1 is a plan view illustrating a wiring member according to a first embodiment.
Figure 2:
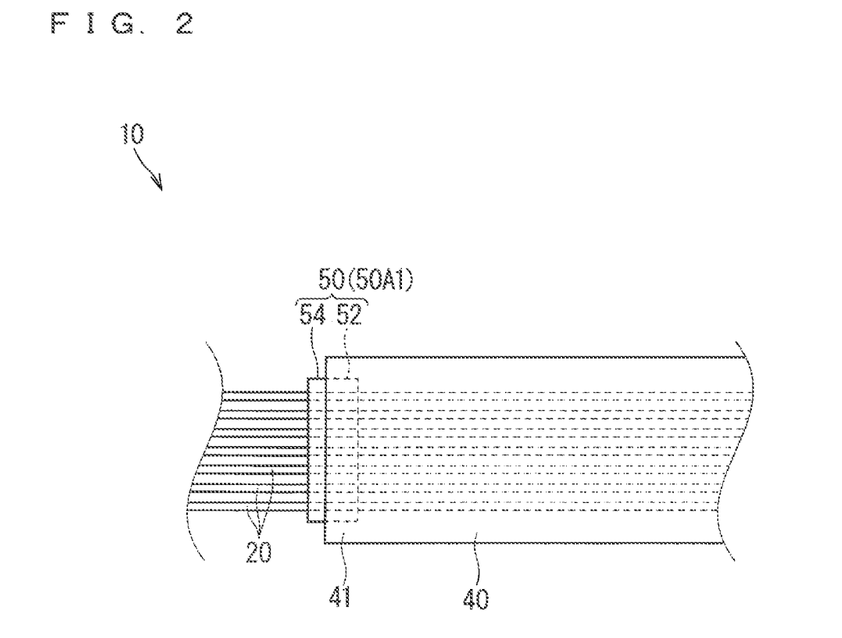
FIG. 2 is an enlarged plan view of one area A1 in FIG. 1.
Figure 3:
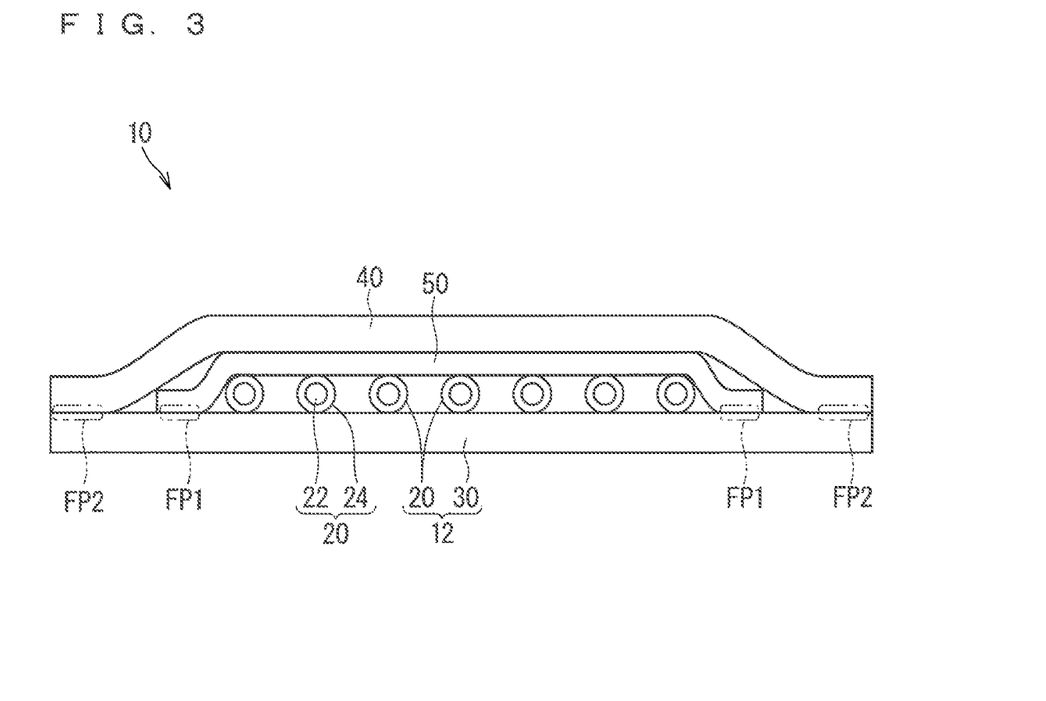
FIG. 3 is a front view of one area A1 in FIG. 1.
Figure 4:
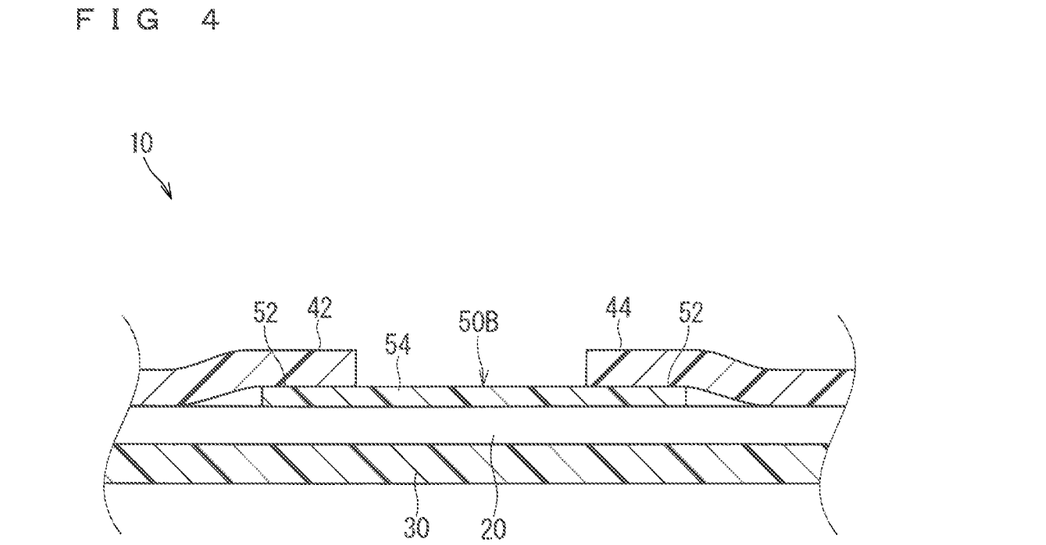
FIG. 4 is a schematic cross-sectional view of an area A2 in FIG. 1.

Hereinafter, a wiring member according to a first embodiment will be described. FIG. 1 is a plan view illustrating a wiring member 10 according to the first embodiment. FIG. 2 is an enlarged plan view of one area A1 in FIG. 1. FIG. 3 is a front view of one area A1 in FIG. 1. FIG. 4 is a schematic cross-sectional view of an area A2 in FIG. 1.

The wiring member 10 includes a wiring body 12, a cover 40, and a buffer member 50.

The wiring body 12 includes a wire-like transmission member 20 and a sheet 30. At least one wire-like transmission member 20 is included. Here, a plurality of wire-like transmission members 20 are included. Each wire-like transmission member 20 is a wire-like member that transmits electricity, light, or the like. The sheet 30 is formed in a flat shape as a whole. By fixing the plurality of wire-like transmission members 20 to the sheet 30, the wiring body 12 is maintained in a flat form. In the example illustrated in FIG. 2, a plurality of wire-like transmission members 20 having the same diameter and structure are arranged on one sheet 30. However, the diameter, structure, and the like of the plurality of wire-like transmission members 20 may be appropriately set, and the wire-like transmission members 20 having different diameters, structures, and the like may be arranged on the same sheet 30.

The plurality of wire-like transmission members 20 are assumed to be members that connect components in the vehicle. For example, a connector C is provided at an end of the wire-like transmission member 20. When the connector C is connected to a connector provided on a partner side component, the wire-like transmission member 20 is connected to the partner side component. That is, the present wiring member 10 is used as the wiring member 10 that electrically (or optically communicably) connects various components in a vehicle or the like. The connector C may be fixed to the sheet 30.

The paths of the plurality of wire-like transmission members 20 are set according to the positions of the components to be connected, and the like. By fixing the plurality of wire-like transmission members 20 to the sheet 30, the plurality of wire-like transmission members 20 are maintained in a state along the wiring path corresponding to the position or the like of the component to be connected to each other. The plurality of wire-like transmission members 20 may be fixed to the sheet 30 in a mode in which the branch portion branches from the trunk portion. The sheet 30 may also be formed in a shape in which a portion to which the branch portion is fixed branches from a portion to which the trunk portion is fixed.

The wire-like transmission member 20 includes a transmission wire body 22 and a coating layer 24. The transmission wire body 22 transmits electricity, light, or the like. The coating layer 24 covers the transmission wire body 22. For example, the wire-like transmission member 20 may be a general electric wire having a core wire and a coating layer around the core wire, or may be a shield wire, a twisted wire, an enameled wire, a nichrome wire, an optical fiber, or the like.

The wire-like transmission member 20 that transmits electricity may be various signal lines or various power lines. A part or the like of the wire-like transmission member 20 that transmits electricity may be used as an antenna, a coil, or the like that transmits a signal or power to or receives a signal or power from a space.

The wire-like transmission member 20 may be a single wire-like object or a composite of a plurality of wire-like objects (twisted wire, cable in which a plurality of wire-like objects are collected and covered with sheath, and the like).

The wire-like transmission member 20 is fixed to the sheet 30. The sheet 30 may be a resin sheet. For example, the sheet 30 may be formed of a resin such as polyvinyl chloride (PVC), polyethylene (PE), polypropylene (PP), or polyethylene terephthalate (PET). The sheet 30 may be a sheet having a uniform solid cross section. The sheet 30 may be a fiber material such as a knitted cloth, a woven cloth, or a non-woven cloth. The sheet 30 may be a foam sheet or the like. The sheet 30 may have a single-layer structure or a multi-layer structure. The sheet 30 may have a metal layer.

The wire-like transmission member 20 may be fixed to the sheet 30, and a fixing structure of the wire-like transmission member 20 with respect to the sheet 30 is not particularly limited. As such a fixing mode, the contact portion may be fixed, the non-contact portion may be fixed, or both may be used in combination. Here, the contact portion fixing means that a portion where the wire-like transmission member 20 and the sheet 30 are in contact with each other is fixed by being attached thereto. In addition, the non-contact portion fixing is a fixing mode that is not the contact portion fixing, and for example, a sewing thread, a cover, an adhesive tape, or the like presses the wire-like transmission member 20 toward the sheet 30 or sandwiches the wire-like transmission member 20 and the sheet 30 to maintain the state. In the following description, it is assumed that the wire-like transmission member 20 and the sheet 30 are in the contact portion fixed state.

As an aspect of the contact portion fixing, the contact portion may be indirectly fixed, the contact portion may be directly fixed, or both may be used in combination in different areas. Here, the contact portion indirect fixing means that the wire-like transmission member 20 and the sheet 30 are indirectly attached and fixed via an adhesive, an adhesive, a double-sided adhesive tape, or the like provided therebetween. In addition, the contact portion direct fixing means that the wire-like transmission member 20 and the sheet 30 are directly attached and fixed without an adhesive or the like provided separately. In the contact portion direct fixing, for example, it is conceivable that the resin contained in at least one of the wire-like transmission member 20 and the sheet 30 is melted to be attached and fixed.

When such a state of directly fixing the contact portion is formed, it is conceivable that the resin is, for example, melted by heat or melted by a solvent. That is, the state of directly fixing the contact portion may be a state of directly fixing the contact portion by heat or a state of directly fixing the contact portion by a solvent. Preferably, the contact portion is directly fixed by heat.

At this time, the means for forming the state of directly fixing the contact portion is not particularly limited, and known means such as welding, fusion, and melting joint can be used. For example, when the state of directly fixing the contact portion by heat is formed by welding, various welding means such as ultrasonic welding, heat-pressure welding, hot air welding, and high frequency welding can be adopted. When the state of directly fixing the contact portion is formed by these means, the wire-like transmission member 20 and the sheet 30 are set to a state of directly fixing the contact portion by the means. Specifically, for example, when the state of directly fixing the contact portion is formed by ultrasonic welding, the wire-like transmission member 20 and the sheet 30 are set to a state of directly fixing the contact portion by ultrasonic welding.

In the following description, it is assumed that the wire-like transmission member 20 and the sheet 30 are in the state of directly fixing the contact portion.

Each of the plurality of wire-like transmission members 20 may be fixed to the sheet 30 at a plurality of positions spaced apart along the longitudinal direction. Each of the plurality of wire-like transmission members 20 may be fixed to the sheet 30 in series as a whole along the longitudinal direction.

The cover 40 covers the wiring body 12. Here, the cover 40 covers the wire-like transmission member 20 fixed to the sheet 30 from the side opposite to the sheet 30. The cover 40 may be provided so as to cover the back surface of the sheet 30. The cover 40 is a member harder than the coating layer 24.

The cover 40 may be entirely or partially overlapped with respect to the sheet 30. The cover 40 may be formed of the same material as the sheet 30 or may be formed of a different material. The cover 40 may be a resin sheet. For example, similarly to the sheet 30, the cover 40 may be formed of resin such as PVC, PE, PP, and PET. One of the sheet 30 and the cover 40 may be softer than the other. The softness here, conversely the hardness, is evaluated by the Rockwell hardness. For example, the cover 40 may be formed of a material such as hard PVC, nylon, PET, or PP, and may be a soft member in which a sheet-like member in which the sheet 30 is formed of soft PVC and a non-woven cloth formed of PET are laminated. For example, the sheet 30 may have flexibility capable of following the bending of the wire-like transmission member 20. That is, the wiring body 12 may be bent in the thickness direction (bent so that a fold is along the main surface of the sheet 30). The cover 40 may regulate bending of the wiring body 12.

The cover 40 includes a plurality of partial covers 42 and 44. Each of the partial covers 42 and 44 covers only a part of the sheet 30 along the longitudinal direction. Each of the partial covers 42 and 44 has a different area covering the sheet 30. The two partial covers 42 and 44 are spaced apart from each other along the longitudinal direction of the sheet 30. One of the two partial covers 42 and 44 is a first cover, and the other is a second cover.

The cover 40 is fixed to the sheet 30, for example, on the sides of the wire-like transmission member 20. As the fixing structure between the sheet 30 and the cover 40, one of the fixing structures described in the fixing structure between the wire-like transmission member 20 and the sheet 30 can be adopted. For example, the fixing structure between the sheet 30 and the cover 40 may be contact portion fixing, or may be either contact portion direct fixing or contact portion indirect fixing. The fixing structure between the sheet 30 and the cover 40 may be the same as or different from the fixing structure between the wire-like transmission member 20 and the sheet 30.

The buffer member 50 is provided between the wire-like transmission member 20 and the cover 40 at at least one end of the cover 40. Here, the buffer member 50 is provided between the wire-like transmission member 20 and the cover 40 in a portion where the edge 41 of the cover 40 covers the wire-like transmission member 20 without interposing the sheet 30 therebetween. Here, the buffer member 50 is provided in the areas A1, A2, A3, A4, and A5 in FIG. 1. Hereinafter, when it is necessary to distinguish the buffer members 50 provided in the areas A1, A2, A3, A4, and A5, the buffer members are sometimes referred to as buffer members 50A1, 50A2, 50A3, 50A4, and 50A5.

The area A1 is an area where an end of the cover 40 (partial cover 42, 44) and an end of the sheet 30 coincide with each other along the longitudinal direction of the sheet 30. Here, that the end of the cover 40 and the end of the sheet 30 coincide with each other means that, for example, one of the end edge of the cover 40 and the end edge of the sheet 30 is located within 20 mm from the other along the longitudinal direction. The buffer member 50A1 is provided at an end of the sheet 30.

The area A2 is an area in which the end of the partial cover 42, 44 is located at an intermediate portion along the longitudinal direction of the sheet 30. The area A2 is an area where the end of the cover 40 (partial cover 42, 44) and the end of the sheet 30 do not coincide with each other along the longitudinal direction of the sheet 30. The area A2 is an area where another partial cover 44 is provided next to one partial cover 42. In the area A2, the two partial covers 42 and 44 are provided at intervals, but the two partial covers 42 and 44 may be provided without intervals. The buffer member 50A2 is provided at an end located at an intermediate portion along the longitudinal direction of the sheet 30 among the ends of the partial covers 42 and 44. The buffer member 50A2 is provided over both ends of the two partial covers 42 and 44.

The area A3 is also an area in which the end of the partial cover 42 is located at the intermediate portion along the longitudinal direction of the sheet 30. The area A3 is an area where another partial cover 44 is not provided next to one partial cover 42. The wire-like transmission member 20 is exposed on the end side of the sheet 30 from the area A3. The buffer member 50A3 is provided at an end of the end of the partial cover 42 located at an intermediate portion along the longitudinal direction of the sheet 30.

The area A4 is located at the branch portion. In the area A4, the sheet 30 is formed in a branching shape, whereas the partial cover 44 is not formed in a branching shape. In the area A4, the side edge of the partial cover 44 covers the wire-like transmission member 20. The buffer member 50A4 is provided at an intermediate portion of the sheet 30 and at a side edge of the partial cover 44.

The area A5 is also located at the branch portion. In the area A5, both the sheet 30 and the partial cover 42 are not formed in a branching shape. In the area A5, the side edge of the sheet 30 and the side edge of the partial cover 44 cover the wire-like transmission member 20. The buffer member 50A5 is provided at an intermediate portion of the sheet 30 and at a side edge of the partial cover 42.

The buffer member 50 is preferably a member that is less likely to damage the wire-like transmission member 20 than the cover 40. For example, from the viewpoint of physical properties, since the buffer member 50 is a member softer than the cover 40, the wire-like transmission member 20 is less likely to be damaged than the cover 40. The softness herein may be evaluated by, for example, Rockwell hardness as described above. The buffer member 50 is a member softer than the coating layer 24. The buffer member 50 may be a member as soft as or harder than the coating layer 24.

The buffer member 50 is provided separately from the sheet 30. For example, similarly to the sheet 30, the buffer member 50 may be formed in a sheet shape using a resin such as PVC, PE, PP, or PET. The buffer member 50 may have a uniform solid cross section. The buffer member 50 may be a fiber material or a foamed sheet. Hereinafter, the buffer member 50 will be described as being formed using a non-woven cloth as a material.

The buffer member 50 includes a first portion 52 and a second portion 54. The first portion 52 is a portion overlapping the edge 41 of the cover 40. The first portion 52 is a portion interposed between the wire-like transmission member 20 and the cover 40. The second portion 54 is a portion protruding from the edge 41 of the cover 40. Thus, the buffer member 50 is disposed so as to straddle the edge 41 of the cover 40.

The buffer member 50 has a dimension capable of coming into contact with the plurality of wire-like transmission members 20 along the width direction of the sheet 30. Here, the buffer member 50 traverses the plurality of wire-like transmission members 20. The buffer member 50 is formed to be equal to or longer than the interval between the two wire-like transmission members 20 located on the outermost sides along the width direction at the edge 41 where the buffer member 50 is provided. Here, the buffer member 50 is formed to be shorter than the sheet 30 and the cover 40.

The buffer member 50 is fixed to the sheet 30 on the sides of the wire-like transmission member 20. As illustrated in FIG. 3, here, the fixing portion FP1 between the buffer member 50 and the sheet 30 is provided inside the fixing portion FP2 between the cover 40 and the sheet 30 along the width direction. A portion of the first portion 52 located on the side of the wire-like transmission member 20 is fixed to the sheet 30. The second portion 54 is not fixed to any of the wire-like transmission member 20, the sheet 30, and the cover 40. The second portion 54 is supported by the first portion 52 in a cantilever manner.

As the fixing structure between the buffer member 50 and the fixing partner (here, the sheet 30), one of the fixing structures described in the fixing structure between the wire-like transmission member 20 and the sheet 30 can be adopted. For example, the fixing structure between the buffer member 50 and the fixing partner (here, the sheet 30) may be contact portion fixing, or may be either contact portion direct fixing or contact portion indirect fixing. The fixing structure between the buffer member 50 and the fixing partner (here, the sheet 30) may be the same as or different from the fixing structure between the wire-like transmission member 20 and the sheet 30. Similarly, the fixing structure between the buffer member 50 and the fixing partner (here, the sheet 30) may be the same as or different from the fixing structure between the sheet 30 and the cover 40. Hereinafter, the buffer member 50 and the fixing partner (here, the sheet 30) will be described as being fixed by adhesion (contact portion indirect fixing) or fusion (contact portion direct fixing).

Here, the buffer member 50 is not fixed to the wire-like transmission member 20 and the cover 40 by adhesion and fusion. In addition to the sheet 30, the buffer member 50 may be fixed to at least one of the wire-like transmission member 20 and the cover 40 also by adhesion or fusion.

Effects of First Embodiment

According to the wiring member 10 configured as described above, the buffer member 50 is provided between the cover 40 and the wire-like transmission member 20, whereby the wire-like transmission member 20 comes into contact with the buffer member 50. As a result, the wire-like transmission member 20 is prevented from coming into contact with the edge of the cover 40, and the edge of the cover 40 is prevented from damaging the wire-like transmission member 20.

Since the buffer member 50 is a member softer than the cover 40, the buffer member 50 that is less likely to damage the wire-like transmission member 20 than the cover 40 is easily provided. Since the buffer member 50 is a member softer than the coating layer 24, the buffer member 50 is less likely to damage the wire-like transmission member 20.

In addition, since the buffer member 50 has a dimension capable of coming into contact with the plurality of wire-like transmission members 20 along the width direction of the sheet 30, the plurality of wire-like transmission members 20 can be easily covered.

In addition, since the buffer member 50 is provided separately from the sheet 30, the degree of freedom in the properties and the like of the buffer member 50 is increased.

Since the buffer member 50 is fixed to the sheet 30 on the side of the wire-like transmission member 20, the buffer member 50 is positioned on the sheet 30.

In addition, since the buffer member 50 and the fixing partner (here, the sheet 30) are fixed by adhesion or fusion, the buffer member 50 and the fixing partner (here, the sheet 30) are easily fixed.

In addition, since the buffer member 50 includes a portion overlapping the edge 41 of the cover 40 and a portion protruding from the edge 41 of the cover 40, the edge 41 of the cover 40 is less likely to come into contact with the wire-like transmission member 20.

In addition, since the buffer member 50 is formed using a non-woven cloth as a material, the buffer member 50 is less likely to damage the wire-like transmission member 20.

Since the buffer members 50A2 and 50A3 are provided at one ends of the partial covers 42 and 44, the wire-like transmission member 20 is protected from the edges 41 of the partial covers 42 and 44 at the intermediate portion of the sheet 30.

Since the buffer member 50A2 is provided over both ends of the two partial covers 42 and 44, a portion of the wire-like transmission member 20 located between the two partial covers 42 and 44 is protected by the buffer member 50A2.

Second Embodiment

Figure 5:
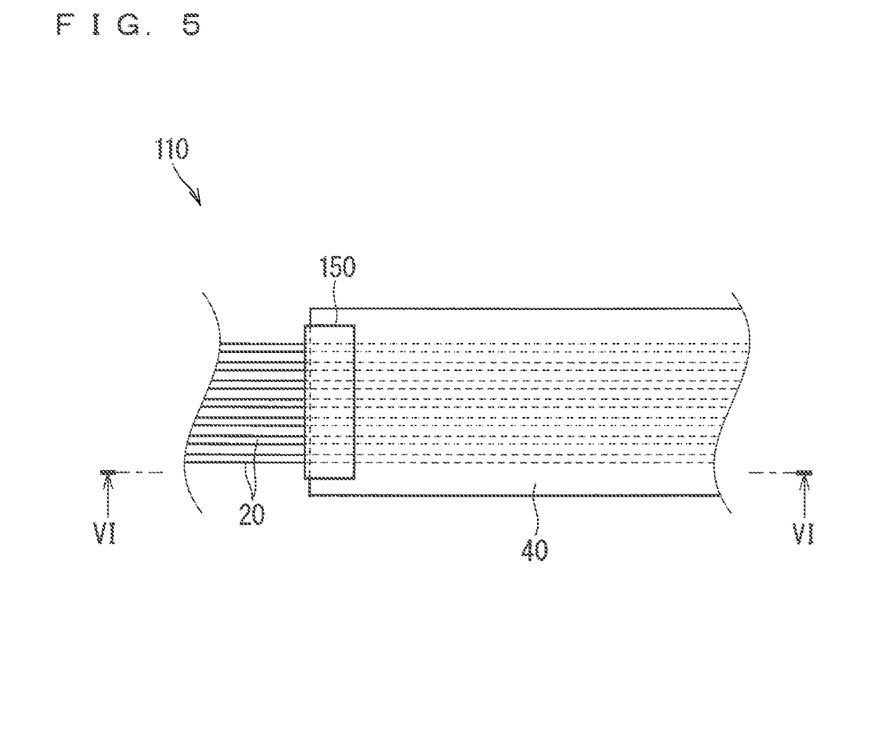
FIG. 5 is a plan view illustrating a wiring member according to a second embodiment.
Figure 6:
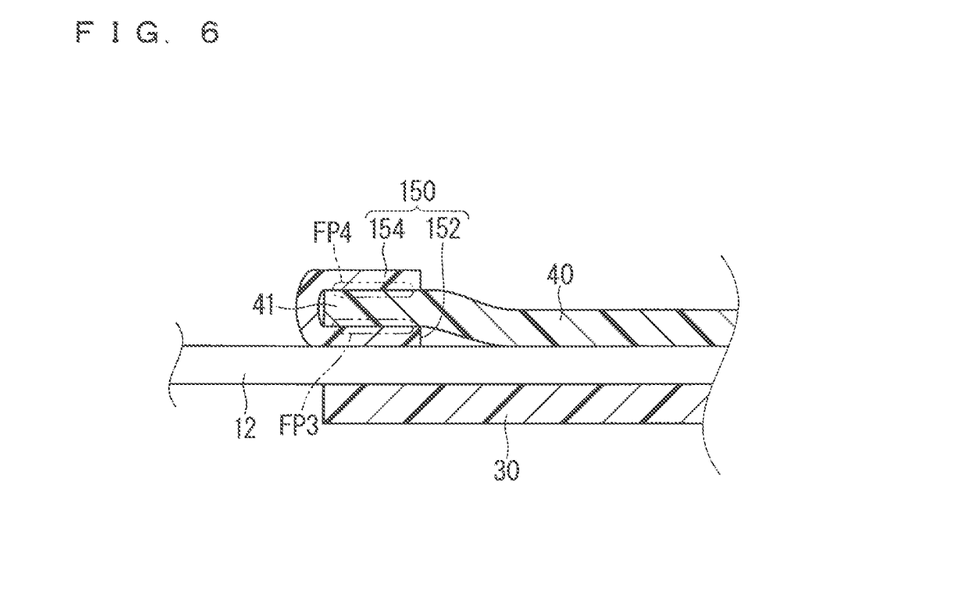
FIG. 6 is a cross-sectional view taken along line VI-VI of FIG. 5.

A wiring member according to a second embodiment will be described. FIG. 5 is a plan view illustrating a wiring member 110 according to the second embodiment. FIG. 6 is a cross-sectional view taken along line VT-VI of FIG. 5. In the description of the present embodiment, the same components as those described above are denoted by the same reference numerals, and the description thereof will be omitted.

The wiring member 110 is different from the wiring member 10 in that a buffer member 150 is fixed to the cover 40. The buffer member 150 is provided in the area A1. The configuration of the buffer member 150 is also applicable to the buffer members 50 provided in the other areas A2, A3, A4, and A5.

Specifically, the buffer member 150 also has a first portion 152 and a second portion 154. The first portion 152 is fixed to the inner surface (the surface on the wire-like transmission member 20 side) of the cover 40. The second portion 154 is folded back and partially overlaps the outer surface of the cover 40. A portion of the second portion 154 overlapping the outer surface of the cover 40 is fixed to the outer surface of the cover 40. As illustrated in FIG. 6, in the cover 40, a fixing portion FP4 with the second portion 154 is located on the back surface side of a fixing portion FP3 with the first portion 152.

The first portion 152 and the portion of the second portion 154 overlapping the outer surface of the cover 40 have the same dimension along the longitudinal direction of the sheet. One of the first portion 152 and the portion of the second portion 154 overlapping the outer surface of the cover 40 may be set to be longer than the other along the longitudinal direction of the sheet. The first portion 152 and the portion of the second portion 154 overlapping the outer surface of the cover 40 have the same dimension along the width direction of the sheet. One of the first portion 152 and the portion of the second portion 154 overlapping the outer surface of the cover 40 may be set to be longer than the other along the width direction of the sheet.

A fixing structure between the buffer member 150 and a fixing partner (here, the cover 40) is adhesion or fusion. Of course, the above-described other fixing structure may be adopted as the fixing structure between the buffer member 150 and the fixing partner (here, the cover 40). In addition, a fixing structure with a fixing partner (here, the cover 40) in the first portion 152 and a fixing structure with a fixing partner (here, the cover 40) in the second portion 154 may be the same or different.

Here, the buffer member 150 is not fixed to the wire-like transmission member 20 and the sheet 30 by adhesion and fusion. In addition to the cover 40, the buffer member 150 may be fixed to at least one of the wire-like transmission member 20 and the sheet 30 by adhesion or fusion.

According to such a wiring member 110, since the buffer member 150 is fixed to the cover 40, the buffer member 150 is positioned on the cover 40. Further, the buffer member 150 can be fixed to the cover 40 before the cover 40 is fixed to the sheet 30. That is, the cover 40 with the buffer member 150 can be fixed to the sheet 30. Since the second portion 154 is fixed to the outer surface of the cover 40, the edge 41 of the cover 40 is covered with the buffer member 150.

Third Embodiment

Figure 7:
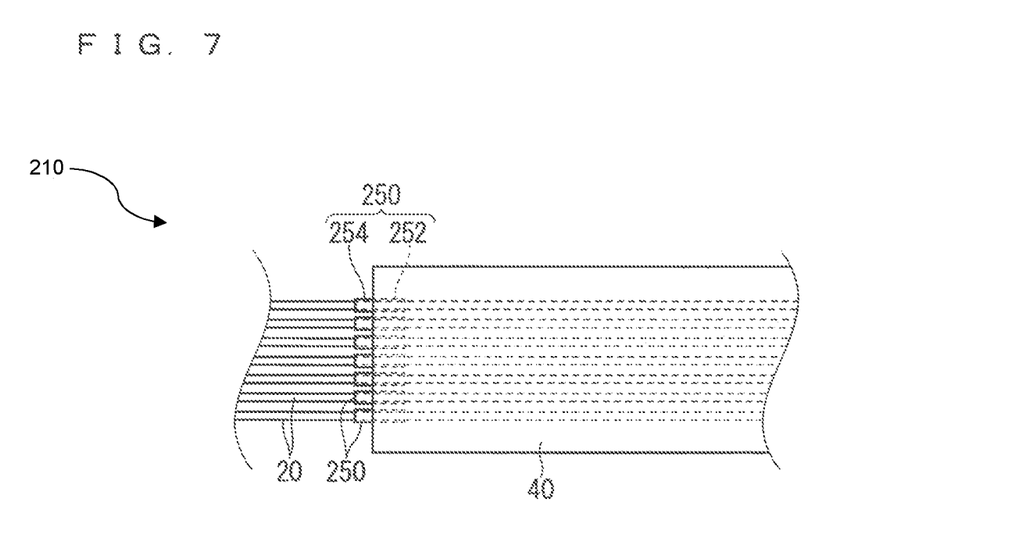
FIG. 7 is a plan view illustrating a wiring member according to a third embodiment.
Figure 8:
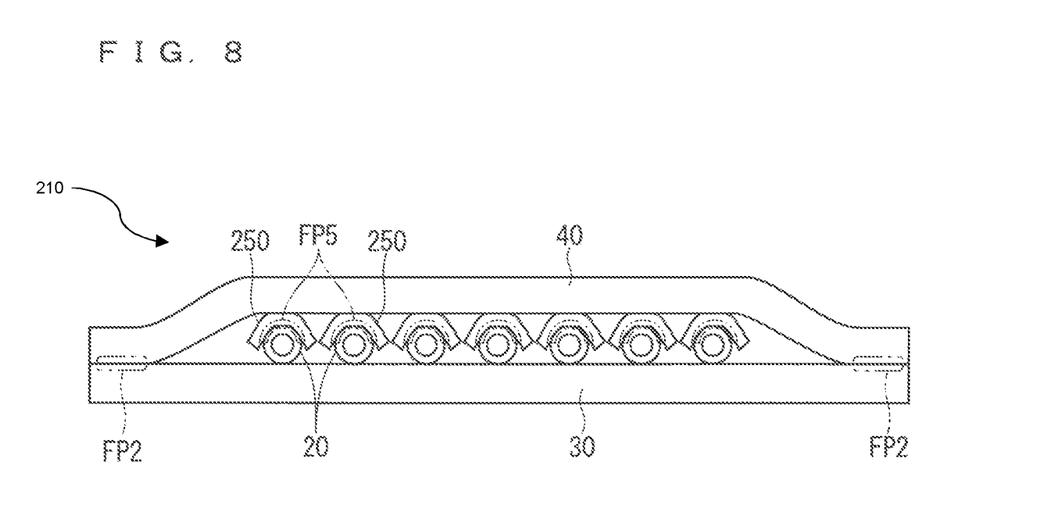
FIG. 8 is a front view illustrating a wiring member according to the third embodiment.

A wiring member according to a third embodiment will be described. FIG. 7 is a plan view illustrating a wiring member 210 according to the third embodiment. FIG. 8 is a front view illustrating the wiring member 210 according to the third embodiment. In the description of the present embodiment, the same components as those described above are denoted by the same reference numerals, and the description thereof will be omitted.

The wiring member 210 is different from the wiring members 10 and 110 in that a buffer member 250 is fixed to the wire-like transmission member 20. The buffer member 250 is provided in the area A1. The configuration of the buffer member 250 is also applicable to the buffer members 50 provided in the other areas A2, A3, A4, and A5.

The buffer member 250 is individually provided in the plurality of wire-like transmission members 20. Each of the buffer members 250 is formed in a size corresponding to each wire-like transmission member 20. The buffer member 250 also has a first portion 252 and a second portion 254. Both the first portion 252 and the second portion 254 of the buffer member 250 are fixed to the wire-like transmission member 20. However, only one of the first portion 252 and the second portion 254 may be fixed to the wire-like transmission member 20.

A fixing portion FP5 between the buffer member 250 and the wire-like transmission member 20 may extend along the periphery of the wire-like transmission member 20. In the example illustrated in FIG. 8, the fixing portion FP5 is set to about a half circumference along the periphery of the wire-like transmission member 20. Of course, a smaller area or a larger area of the buffer member 250 and the wire-like transmission member 20 may be fixed along the periphery of the wire-like transmission member 20.

The fixing structure between the buffer member 250 and a fixing partner (here, the wire-like transmission member 20) may be adhesion or fusion, or the other fixing structure described above may be adopted. In addition, the fixing structure with the fixing partner (here, the wire-like transmission member 20) in the first portion 252 and the fixing structure with the fixing partner (here, the wire-like transmission member 20) in the second portion 254 may be the same or different.

Here, the buffer member 250 is not fixed to the sheet 30 and the cover 40 by adhesion and fusion. In addition to the wire-like transmission member 20, the buffer member 250 may be fixed to at least one of the sheet 30 and the cover 40 by adhesion or fusion.

According to such a wiring member 210, since the buffer member 250 is fixed to the wire-like transmission member 20, the buffer member 250 is positioned on the wire-like transmission member 20.

Fourth Embodiment

Figure 9:
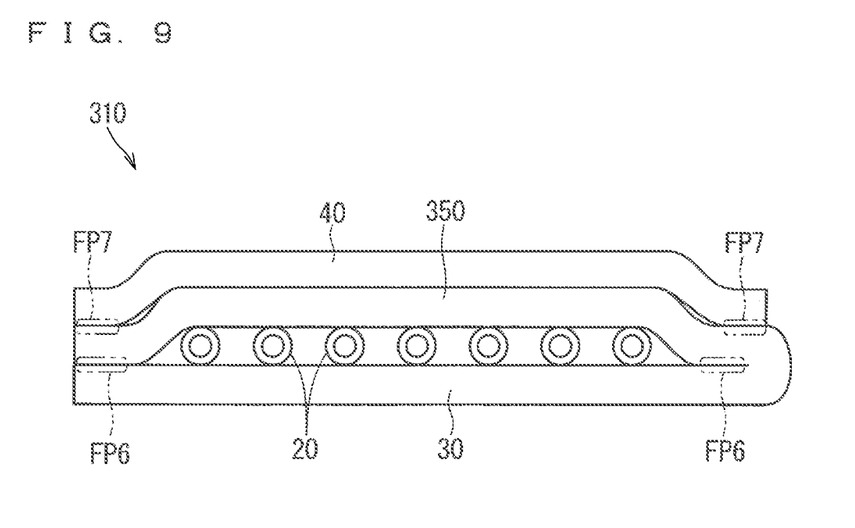
FIG. 9 is a front view illustrating a wiring member according to a fourth embodiment.
Figure 10:
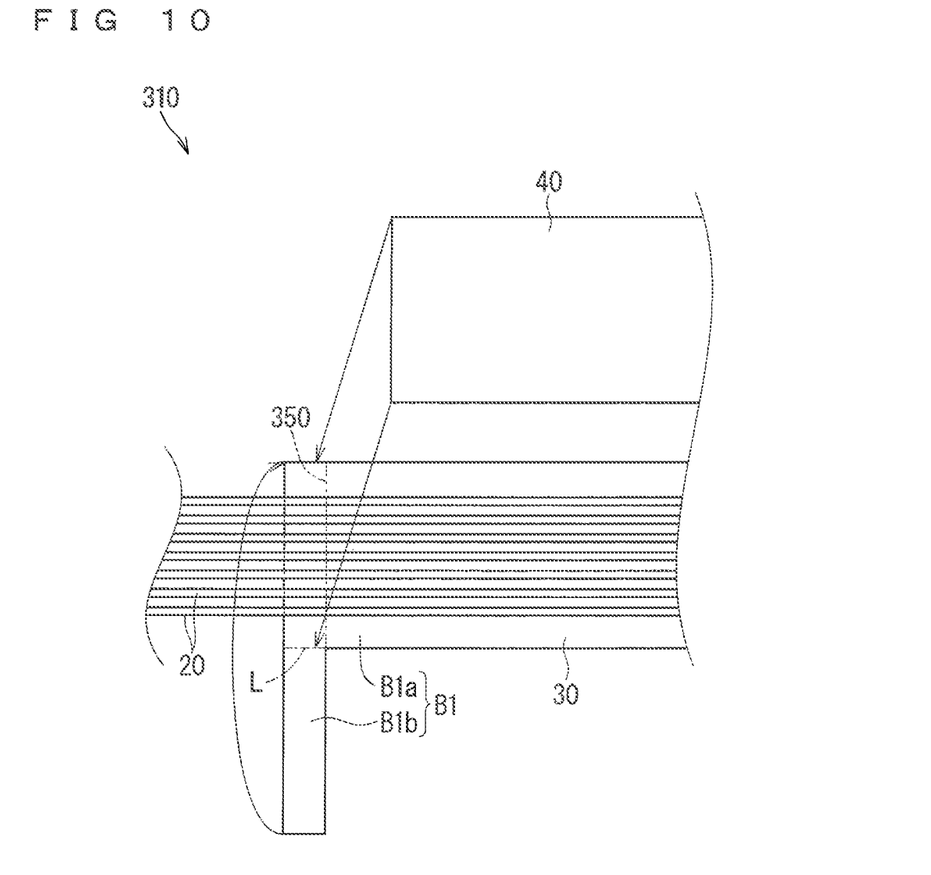
FIG. 10 is an exploded plan view illustrating the wiring member according to the fourth embodiment.

A wiring member according to a fourth embodiment will be described. FIG. 9 is a front view illustrating a wiring member 310 according to the fourth embodiment. FIG. 10 is an exploded plan view illustrating the wiring member 310 according to the fourth embodiment. In the description of the present embodiment, the same components as those described above are denoted by the same reference numerals, and the description thereof will be omitted.

The wiring member 310 of the present example is different from the wiring members 10, 110, and 210 in that a part of the sheet 30 is bent and a buffer member 350 is provided. The buffer member 350 is provided in the area A1. The configuration of the buffer member 350 is also applicable to the buffer members 50 provided in the other areas A2, A3, A4, and A5.

Specifically, as shown in FIG. 10, a base material B1 is prepared. The base material B1 has a sheet portion B1$a$ and a buffer member portion B1$b$. The sheet portion B1$a$ is a portion to be the sheet 30. The wire-like transmission member 20 is fixed to the sheet portion B1$a$. The buffer member portion B1$b$ is a portion to be the buffer member 350. The buffer member portion B1b is continuous with the sheet portion B1a. The buffer member portion B1b is bent and overlapped with the wire-like transmission member 20. Here, the bent buffer member portion B1b is also overlapped with the sheet portion B1a. In the example shown in FIG. 10, the buffer member portion B1b is continuous with the sheet portion B1a in the width direction. In this case, a fold L when the buffer member portion B1b is bent extends along the longitudinal direction of the sheet portion B1a.

An end where the sheet 30 and the buffer member 350 are connected to each other at each end of the sheet 30 and the buffer member 350 is referred to as a base end. An end where the sheet 30 and the buffer member 350 are not connected to each other at each end of the sheet 30 and the buffer member 350, that is, an end opposite to the base end is referred to as a leading end. At least the leading ends of the base ends and the leading ends of the sheet 30 and the buffer member 350 are preferably fixed to each other. The base ends of the sheet 30 and the buffer member 50 may also be fixed to each other.

Here, the buffer member 350 covers the entire sheet 30 along the width direction. Therefore, the cover 40 is fixed to the buffer member 350 in a portion where the buffer member 350 is provided. The buffer member 350 is fixed to the sheet 30 and the cover 40 at the same position along the width direction of the sheet 30. As illustrated in FIG. 9, a fixing portion FP7 between the cover 40 and the buffer member 350 is located on a fixing portion FP6 between the sheet 30 and the buffer member 350. A fixing structure between the buffer member 350 and a fixing partner (here, the sheet 30 and the cover 40) is adhesion or fusion. As a fixing structure between the buffer member 350 and the fixing partner (here, the sheet 30 and the cover 40), the above-described other fixing structure may be adopted. The fixing structure between the buffer member 350 and the sheet 30 and the fixing structure between the buffer member and the cover 40 may be the same or different.

As illustrated in FIG. 10, the cover 40 is overlapped at a position slightly shifted rearward with respect to the buffer member 350, whereby a first portion and a second portion are provided in the buffer member 350.

According to such a wiring member 310, since a part of the sheet 30 is folded and the buffer member 350 is provided, an increase in the number of parts can be suppressed even when the buffer member 350 is provided.

Modification Example

Figure 11:
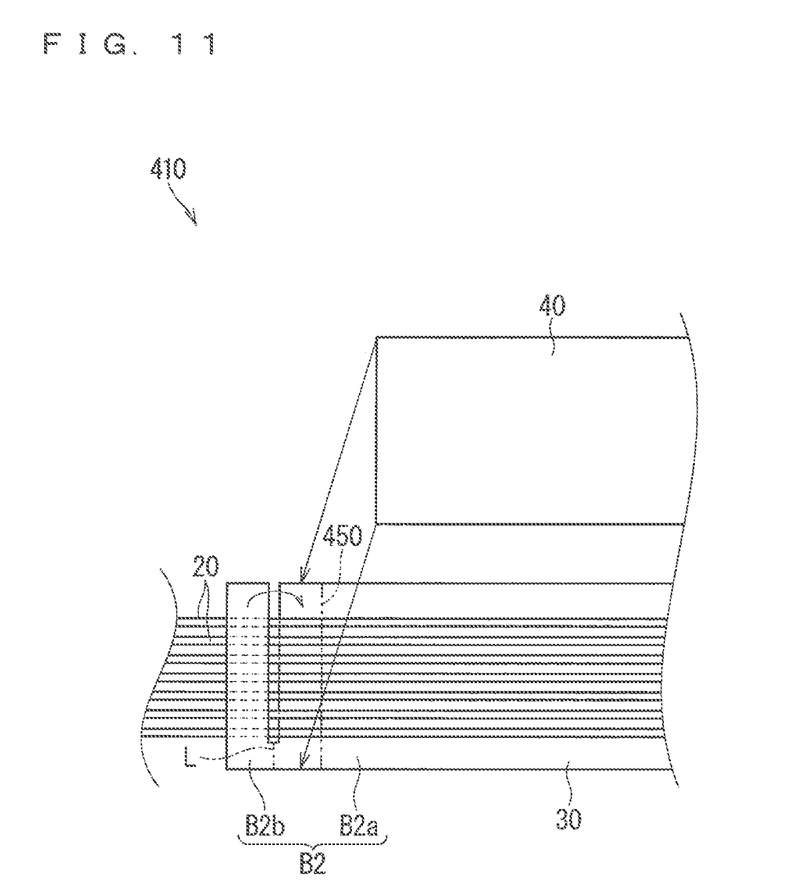
FIG. 11 is an exploded plan view illustrating a modification example of the wiring member according to the fourth embodiment.

FIG. 11 is an exploded plan view illustrating a modification example of the wiring member 310 according to the fourth embodiment.

In a wiring member 410 according to the modification example, in a base material B2, a buffer member portion B2b is continuous with a sheet portion B2a along the longitudinal direction. In this case, a fold L when the buffer member portion B2b is bent extends along a direction intersecting the longitudinal direction of the sheet portion B2a.

The buffer member portion B2b is continuous with only one of both ends of the sheet portion B2a along the width direction. Therefore, the buffer member portion B2b is easily disposed on a side opposite to the sheet portion B2a with respect to the wire-like transmission member 20.

In the example shown in FIG. 11, a part of the base material B2 between the buffer member portion B2b and the sheet portion B2a is cut out. More specifically, a side portion of a connecting portion connecting the buffer member portion B2b and the sheet portion B2a is cut out. A cut may be made on the side of the connecting portion connecting the buffer member portion B2b and the sheet portion B2a.

A buffer member 450 formed by bending the buffer member portion B2b is preferably fixed to the sheet at positions on both sides of the wire-like transmission member 20. The width dimension of the buffer member 450 may be smaller than the width dimension of the sheet 30 and the cover 40 as in the example illustrated in FIG. 3.

In the base material B2 shown in FIG. 11, the cover 40 may be disposed on the buffer member portion B2b in a state where the buffer member portion B2b is not bent.

In addition, although it has been described that the wire-like transmission member 20 is less likely to be damaged than the cover 40 because the buffer member is a member softer than the cover 40, this is not an essential configuration. The buffer member may be as hard as or harder than the cover 40. In this case, for example, from the viewpoint of the shape, the edge of the buffer member may be rounded or the like to prevent the edge of the buffer member from contacting the wire-like transmission member 20, so that the buffer member may be less likely to damage the wire-like transmission member 20 than the cover 40.

Although the cover 40 has been described as including the plurality of partial covers 42 and 44, this is not an essential configuration. The cover may include only one partial cover. In other words, one cover may cover the wiring body 12 in an area smaller than the sheet 30. The cover may cover the wiring body 12 in an area same as or larger than the sheet 30.

Although the buffer member has been described as including the first portion overlapping the edge 41 of the cover 40 and the second portion protruding from the edge 41 of the cover 40, this is not an essential configuration. The second portion protruding from the edge 41 of the cover 40 may be omitted.

The buffer member may be an adhesive tape wound around the wire-like transmission member 20. The buffer member may be a tubular member such as a corrugated tube that accommodates the wire-like transmission member 20 therein.

Note that the configurations described in the above embodiments and modification example can be appropriately combined as long as they do not contradict each other. For example, the buffer members 50, 150, 350, and 450 may be formed in a size corresponding to the wire-like transmission member 20 like the buffer member 250, or the buffer member 250 may be formed in a size capable of covering the plurality of wire-like transmission members 20 like the buffer members 50, 150, 350, and 450.

EXPLANATION OF REFERENCE SIGNS 10, 110, 210, 310, 410: wiring member
12: wiring body
20: wire-like transmission member
22: transmission wire body
24: coating layer
30: sheet
40: cover
41: edge
42, 44: partial cover
50, 50A1, 50A2, 50A3, 50A4, 50A5, 150, 250, 350, 450: buffer member
52, 152, 252: first portion
54, 154, 254: second portion
B1, B2: base material
B1a, B2a: sheet portion B1b, B2b: buffer member portion
C: connector
FP1, FP2, FP3, FP4, FP5, FP6, FP7: fixing portion
L: fold

The invention claimed is:

1. A wiring member comprising:
a wiring body including a wire-like transmission member and a sheet to which the wire-like transmission member is fixed;
a cover that covers the wiring body; and
a buffer member, wherein
the wire-like transmission member includes a transmission wire body and a coating layer covering the transmission wire body,
the cover is a member harder than the coating layer, and
the buffer member is provided at at least one end of the cover, and is disposed between the wire-like transmission member and the cover.

2. The wiring member according to claim 1, wherein the buffer member is a member softer than the cover.

3. The wiring member according to claim 2, wherein the buffer member is a member softer than the coating layer.

4. The wiring member according to claim 1, wherein the buffer member has a dimension capable of coming into contact with a plurality of wire-like transmission members along a width direction of the sheet.

5. The wiring member according to claim 1, wherein the buffer member is provided by bending a part of the sheet.

6. The wiring member according to claim 1, wherein the buffer member is provided separately from the sheet.

7. The wiring member according to claim 1, wherein the buffer member is fixed to the wire-like transmission member.

8. The wiring member according to claim 1, wherein the buffer member is fixed to the cover.

9. The wiring member according to claim 1, wherein the buffer member is fixed to the sheet on a side of the wire-like transmission member.

10. The wiring member according to claim 1, wherein the buffer member and a fixing partner are fixed by adhesion or fusion.

11. The wiring member according to claim 1, wherein the buffer member includes a portion overlapping an edge of the cover and a portion protruding from the edge of the cover.

12. The wiring member according to claim 1, wherein the buffer member is formed using a non-woven cloth as a material.

13. The wiring member according to claim 1, wherein the cover includes a first cover that covers only a part of the sheet along a longitudinal direction,
one end of the first cover is located at an intermediate portion along the longitudinal direction of the sheet, and
the buffer member is provided at an edge of one end of the first cover.

14. The wiring member according to claim 13, wherein the cover includes a second cover provided at an interval from the first cover along the longitudinal direction of the sheet, and
the buffer member is provided over one end of the first cover and one end of the second cover.

* * * * *